D. Paterson,
Clamp,
Nº 56,326. Patented July 10, 1866.
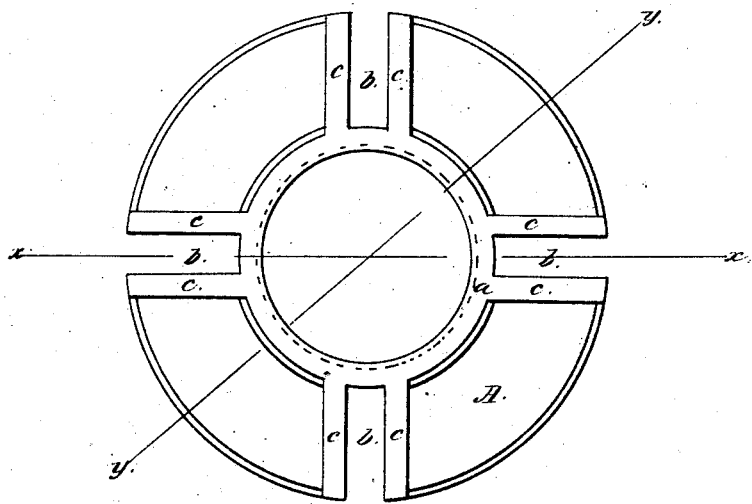

UNITED STATES PATENT OFFICE.

DAVID PATERSON, OF JERSEY CITY, NEW JERSEY, ASSIGNOR TO AUSTIN R. PARDEE, OF SAME PLACE.

IMPROVED FLANGE.

Specification forming part of Letters Patent No. 56,326, dated July 10, 1866.

*To all whom it may concern:*

Be it known that I, DAVID PATERSON, of Jersey City, in the county of Hudson and State of New Jersey, have invented a new and Improved Flange; and I do hereby declare that the following is a full, clear, and exact description thereof, which will enable others skilled in the art to make and use the same, reference being had to the accompanying drawings, forming a part of this specification, in which—

Figure 1 represents a plan or top view of this invention. Fig. 2 is a central section of the same, taken in the plane indicated by the line $x\ x$, Fig. 1. Fig. 3 is a similar section, the plane of section being indicated by the line $y\ y$, Fig. 1.

Similar letters of reference indicate like parts.

This invention consists in a flange which is cast with strengthening-ribs and with radiating slots to receive the bolts in such a manner that all the time and labor of boring holes in the flanges is saved, and a flange is obtained of superior convenience, strength, and durability.

A represents my flange, which is cast of iron or any other suitable material, in any desirable form or size. From the central hub, $a$, of this flange extend radiating slots $b$, which are intended to receive the bolts or screws which serve to fasten the flange in its position, and from the sides of these slots rise the ribs $c$ to a level with the top edge of the hub $a$. These ribs serve to strengthen the flange; and, furthermore, they also serve as bearing-surfaces for the heads or nuts of the bolts, so that said nuts can be readily turned, and are not liable to come in contact with the circumference of the hub.

By having the radiating slots cast in, a flange is obtained which can be readily attached. There is no trouble in fitting or boring the holes. The slots will fit the holes whether the same are a little closer to or farther from the center; and, furthermore, the nuts can be turned much easier and the screw-wrench can be applied to them much more readily than in ordinary flanges, where the corners of the nuts are liable to strike the circumference of the hub of the flanges. If desired, a saving in packing can also be effected by cutting the packing-ring just large enough to extend to the inner ends of the radiating slots, the strength of the flange being increased by the ribs to such an extent that the same is not liable to crack if the screws are tightened up when the packing-piece does not extend clear out to the periphery of the flange.

What I claim as new, and desire to secure by Letters Patent, is—

A flange provided with radiating slots $b$ and ribs $c$, rising from the edges of said slots to a level with the central hub, $a$, substantially as and for the purpose described.

The above specification of my invention signed by me this 12th day of March, 1866.

DAVID PATERSON.

Witnesses:
M. M. LIVINGSTON,
W. HAUFF.